US010126914B2

(12) United States Patent
Hiroura (10) Patent No.: US 10,126,914 B2
(45) Date of Patent: Nov. 13, 2018

(54) INFORMATION PROCESSING DEVICE, DISPLAY CONTROL METHOD, AND COMPUTER PROGRAM RECORDING MEDIUM

(71) Applicant: CANON KABUSHIKI KAISHA, Tokyo (JP)

(72) Inventor: Masayoshi Hiroura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 215 days.

(21) Appl. No.: 14/257,903

(22) Filed: Apr. 21, 2014

(65) Prior Publication Data

US 2014/0325433 A1 Oct. 30, 2014

(30) Foreign Application Priority Data

Apr. 24, 2013 (JP) ................................. 2013-091089

(51) Int. Cl.
*G06F 3/0488* (2013.01)
*G06F 3/0482* (2013.01)
*G06F 9/451* (2018.01)
*G06F 9/44* (2018.01)
(Continued)

(52) U.S. Cl.
CPC .......... *G06F 3/0482* (2013.01); *G06F 3/0488* (2013.01); *G06F 9/4443* (2013.01); *G06F 9/451* (2018.02); *G06F 3/04817* (2013.01); *G06F 3/04842* (2013.01); *G06F 2203/04803* (2013.01)

(58) Field of Classification Search
CPC ............. G06F 3/04817; G06F 3/04842; G06F 3/0488; G06F 9/4443; G06F 2203/04803; G06F 3/0482; G06F 3/04883; G09G 3/00; H04M 1/72522; H04M 1/72583
See application file for complete search history.

(56) References Cited

U.S. PATENT DOCUMENTS 6,919,864 B1 * 7/2005 Macor .................. G06F 1/1601
345/1.1
8,558,814 B2 * 10/2013 Kim ..................... G06F 3/04886
345/173

(Continued)

FOREIGN PATENT DOCUMENTS

JP 2012521595 A 9/2012
WO 2011/135894 A1 11/2011

*Primary Examiner* — Shen Shiau
(74) *Attorney, Agent, or Firm* — Canon USA, Inc. I.P. Division (57) ABSTRACT

An information processing device facilitating easy specification of a display position of an operation screen of each software application when a plurality of software applications are executed at a same time. The device includes a display control unit configured to display a plurality of arranged icons on a display screen; a position acquisition unit configured to acquire input position specified on the display screen; and an identifying unit configured to identify a plurality of software applications associated with the plurality of icons in accordance with positions of the plurality of icons displayed on the display screen and a plurality of input positions simultaneously acquired by the position acquisition unit. The display control unit is configured to display one execution screen of each of the software application identified by the identifying unit on each of a plurality of partial areas, the partial areas constituting the display screen.

6 Claims, 11 Drawing Sheets

(51) Int. Cl.
*G06F 3/0481* (2013.01)
*G06F 3/0484* (2013.01)

(56) References Cited

U.S. PATENT DOCUMENTS

| | | | | |
|---|---|---|---|---|
| 8,988,381 B1 * | 3/2015 | Kim | ............... | G06F 1/1652 |
| | | | | 345/108 |
| 9,128,606 B2 * | 9/2015 | Won | ............... | G06F 3/04883 |
| 9,298,341 B2 * | 3/2016 | Kim | ............... | G06F 3/0481 |
| 2003/0197739 A1 * | 10/2003 | Bauer | ............... | G06F 3/0481 |
| | | | | 715/800 |
| 2005/0188339 A1 * | 8/2005 | Anderson | ............... | G06F 17/50 |
| | | | | 716/139 |
| 2007/0011702 A1 * | 1/2007 | Vaysman | ............... | H04N 21/84 |
| | | | | 725/45 |
| 2008/0172609 A1 * | 7/2008 | Rytivaara | ............... | G06F 9/44505 |
| | | | | 715/700 |
| 2009/0144661 A1 * | 6/2009 | Nakajima | ............... | G06F 3/048 |
| | | | | 715/835 |
| 2010/0134432 A1 * | 6/2010 | Seo | ............... | G06F 3/04817 |
| | | | | 345/173 |
| 2010/0248788 A1 * | 9/2010 | Yook | ............... | G06F 3/0481 |
| | | | | 455/566 |
| 2012/0176322 A1 * | 7/2012 | Karmi | ............... | G06F 3/04883 |
| | | | | 345/173 |
| 2012/0289290 A1 * | 11/2012 | Chae | ............... | G06F 3/0488 |
| | | | | 455/566 |
| 2012/0293433 A1 * | 11/2012 | Yamamoto | ............... | G06F 3/0412 |
| | | | | 345/173 |
| 2013/0021273 A1 * | 1/2013 | Lee | ............... | G06F 3/04883 |
| | | | | 345/173 |
| 2013/0120295 A1 * | 5/2013 | Kim | ............... | G06F 3/01 |
| | | | | 345/173 |
| 2013/0135178 A1 | 5/2013 | Miyahara | | |
| 2013/0154978 A1 * | 6/2013 | Kim | ............... | G06F 3/0483 |
| | | | | 345/173 |
| 2013/0167078 A1 * | 6/2013 | Monnig | ............... | G06F 3/0484 |
| | | | | 715/800 |
| 2013/0187861 A1 * | 7/2013 | Lavallee | ............... | G06F 9/543 |
| | | | | 345/173 |
| 2013/0222321 A1 * | 8/2013 | Buening | ............... | G06F 3/041 |
| | | | | 345/173 |
| 2013/0239055 A1 * | 9/2013 | Ubillos | ............... | H04L 51/24 |
| | | | | 715/815 |
| 2013/0263042 A1 * | 10/2013 | Buening | ............... | G06F 3/0488 |
| | | | | 715/783 |
| 2013/0305184 A1 * | 11/2013 | Kim | ............... | G06F 3/0481 |
| | | | | 715/781 |
| 2013/0332881 A1 * | 12/2013 | Yook | ............... | G06F 3/0481 |
| | | | | 715/781 |
| 2013/0346912 A1 * | 12/2013 | Buening | ............... | G06F 3/0488 |
| | | | | 715/783 |
| 2014/0053097 A1 * | 2/2014 | Shin | ............... | G06F 9/4443 |
| | | | | 715/779 |
| 2014/0089831 A1 * | 3/2014 | Kim | ............... | G06F 3/0481 |
| | | | | 715/769 |
| 2014/0089832 A1 * | 3/2014 | Kim | ............... | G06F 3/0481 |
| | | | | 715/769 |
| 2014/0089833 A1 * | 3/2014 | Hwang | ............... | G06F 3/04883 |
| | | | | 715/769 |
| 2014/0157163 A1 * | 6/2014 | Strutin-Belinoff | ............... | G06F 3/04883 |
| | | | | 715/769 |
| 2014/0164966 A1 * | 6/2014 | Kim | ............... | G06F 3/04886 |
| | | | | 715/769 |
| 2014/0245203 A1 * | 8/2014 | Lee | ............... | G06F 3/04817 |
| | | | | 715/765 |
| 2014/0313143 A1 * | 10/2014 | Jung | ............... | G06F 3/041 |
| | | | | 345/173 |
| 2014/0337794 A1 * | 11/2014 | Vranjes | ............... | G06F 9/4443 |
| | | | | 715/800 |
| 2014/0351748 A1 * | 11/2014 | Xia | ............... | G06F 3/0481 |
| | | | | 715/798 |
| 2015/0029149 A1 * | 1/2015 | Andersson | ............... | G06F 3/048 |
| | | | | 345/174 |
| 2015/0067588 A1 * | 3/2015 | Shim | ............... | G06F 3/0482 |
| | | | | 715/790 |
| 2015/0169216 A1 * | 6/2015 | Cho | ............... | G06F 3/04883 |
| | | | | 715/764 |
| 2015/0227274 A1 * | 8/2015 | Lee | ............... | G06F 3/0488 |
| | | | | 715/776 |
| 2016/0202852 A1 * | 7/2016 | Park | ............... | G06F 3/0488 |
| | | | | 715/781 |

* cited by examiner

INFORMATION PROCESSING DEVICE, DISPLAY CONTROL METHOD, AND COMPUTER PROGRAM RECORDING MEDIUM

BACKGROUND OF THE INVENTION

Field of the Invention

The present invention relates to a display control technology when a plurality of software applications are executed in an information processing device such as smart phone, tablet PC (Personal Computer) and the like.

Description of the Related Art

When a plurality of software applications are executed in the information processing device such as the smart phone, the tablet PC and the like, it is desired to display an operation screen of each software application on a screen at a time. It is desired, for example, to use Internet while sending and receiving e-mail by simultaneously activating a mailer for sending and receiving e-mail and an Internet browser. Here, "execution of software application" includes activating the software application. Also, it includes a situation where activates the software application which has already been activated but is inactive.

US2013/135178A1 discloses a technology for executing two software applications to display each operation screen. In US2013/135178A1, a pair-icon is displayed on a display, and the pair icon is to simultaneously activate two software applications to be paired. When a user selects the pair icon, the images derived from the two software applications are displayed on a plurality of displays in a predetermined layout.

In US2013/135178A1, the image derived from one software application is displayed on one display. Therefore, when a plurality of software applications are executed at a time, a plurality of corresponding displays are required. Further, it is necessary to previously set the screen layout of a plurality of software applications executed at a time.

In order to solve the above-mentioned concerns, an aspect of the present invention is to provide a technology, which enables easy specification of a display position of the operation screen of each software application when a plurality of software applications are executed at a time.

SUMMARY OF THE INVENTION

The information processing device for solving the above-mentioned problem comprises a display control unit configured to display a plurality of arranged icons on a display screen; a position acquisition unit configured to acquire a position specified on the display screen; and an identifying unit configured to identify a plurality of software applications associated with the plurality of icons in accordance with positions of the plurality of icons displayed on the display screen by the display control unit and a plurality of input positions simultaneously acquired by the position acquisition unit; wherein the display control unit is configured to display one execution screen of each of the software application identified by the identifying unit on each of a plurality of partial areas, the partial areas constituting the display screen.

The present invention enables to easily specify a display position of the operation screen of each software application is displayed when a plurality of software applications are executed at a time.

Further features of the present invention will become apparent from the following description of exemplary embodiments (with reference to the attached drawings).

DESCRIPTION OF THE EMBODIMENTS

The embodiments of the present invention will be described in detail with reference to the drawings. It should be noted that the construction described in the embodiments is simply an example and the invention is not limited to the construction as described in the embodiments.

Figure 1:
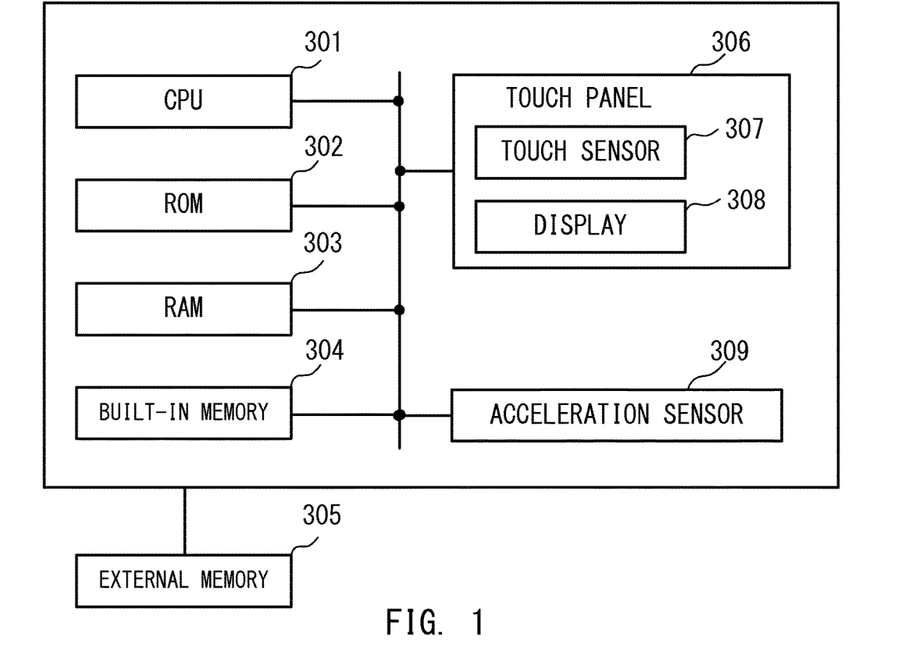
FIG. 1 is a hardware configuration diagram of an information processing device.

FIG. 1 is a hardware configuration diagram of an information processing device. The information processing device comprises a central processing unit (CPU) 301, a read only memory (ROM) 302, a random access memory (RAM) 303, and a built-in memory 304. An external memory 305 is connected to the information processing device. Further, the information processing device comprises a touch panel 306 and an acceleration sensor 309 and is a mobile terminal device, which can be realized, for example, by the smart phone or the tablet PC.

The CPU 301 reads a computer program stored in the ROM 302. Using the RAM 303 as a work area and executing the computer program as read, the CPU 301 controls the entire operation of the information processing device. A functional block, which is described later, is realized in the information processing device by executing the computer program with the CPU 301. The built-in memory 304 and the external memory 305 are storage devices for storing content such as application program, image file and the like. These contents are appropriately read with the CPU 301 and executed or processed.

The touch panel 306 includes a touch sensor 307 and a display 30. The touch sensor 307 is a sensing device for sensing a position specified on a display screen of the display 308 by a user with a stylus pen or user's finger. The touch sensor 307 is capable of sensing a plurality of positions on the display screen at a time. The display 308 is a display device for displaying text or figure. In this embodiment, an icon associated with a software application or a screen (for example, an operation screen) at the time of executing the software application is displayed on the display 308. When the touch sensor 307 senses that display position of the icon was specified by the touch sensor 307, the software application associated with the icon is executed. The acceleration sensor 309 is a sensor for sensing acceleration of the information processing device.

Figure 2:
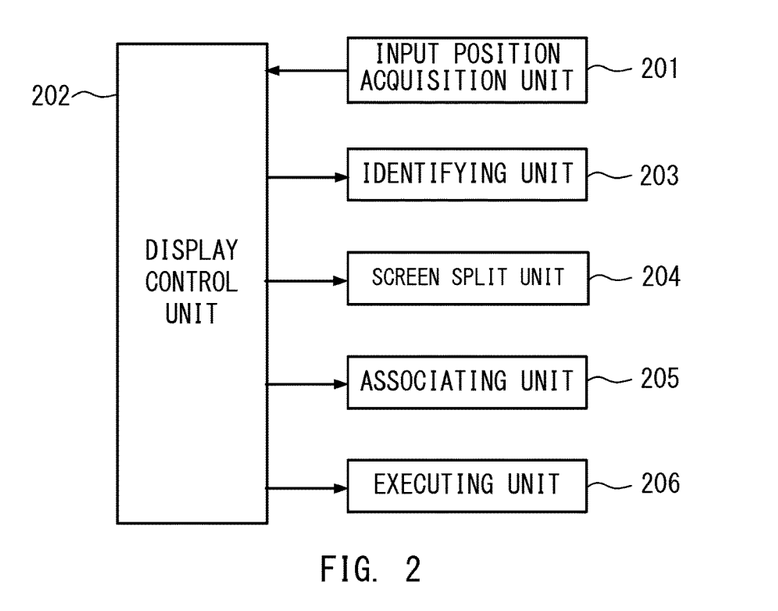
FIG. 2 is a functional block diagram of the display processing device.

FIG. 2 is a functional block diagram of the information processing device. Each functional block may be comprised as hardware. In this embodiment, however, it is realized by executing a computer program with the CPU 301. The information processing device comprises an input position acquisition unit 201, a display control unit 202, an identifying unit 203, a screen split unit 204, an associating unit 205, and an executing unit 206.

The input position acquisition unit 201 acquires a position on the display screen of the display 308 specified by the user as an electric signal through the touch sensor 307 and then sends the position signal representing the position to the display control unit 202. The position is represented, for example, as coordinates on the display screen. The position on the display screen specified by the user is hereinafter referred to as "input position".

The identifying unit 203 identifies a software application for execution based on the input position represented by the position signal. The identifying unit 203 identifies the icon of the input position in accordance with the input position and the display position of the icon displayed on the display screen of the display 308. The software application associated with the identified icon will be the software application for execution.

The screen split unit 204 detects a posture, or an orientation, of the information processing device based on a sensing result and the like obtained from the acceleration sensor 309. Then, the screen split unit 204 splits the display area of the display screen into a plurality of partial areas in accordance with an orientation of the display screen of the display 308 and the input position. The screen split unit 204 splits the display screen into the number of partial areas, the number being equal to that of the software application identified by the identifying unit 203. The acceleration sensor 309 acts as a position sensing sensor, which senses the posture of the information processing device. The screen split unit 204 detects the posture of the information processing device in accordance with the orientation and magnitude of the acceleration sensed by the acceleration sensor 309.

The associating unit 205 associates the software application identified by the identifying unit 203 with the partial areas split by the screen split unit 204. The executing unit 206 executes the software application identified by the identifying unit 203. The display control unit 202 displays the screen such as the operation screen of the software application executed by the executing unit 206 on the partial areas associated by the associating unit 205.

FIGS. 3 to 6 are flowcharts representing processing procedures when executing a plurality of software applications with the information processing device as mentioned above.

(1) Input Position Acquisition Processing

Figure 3:
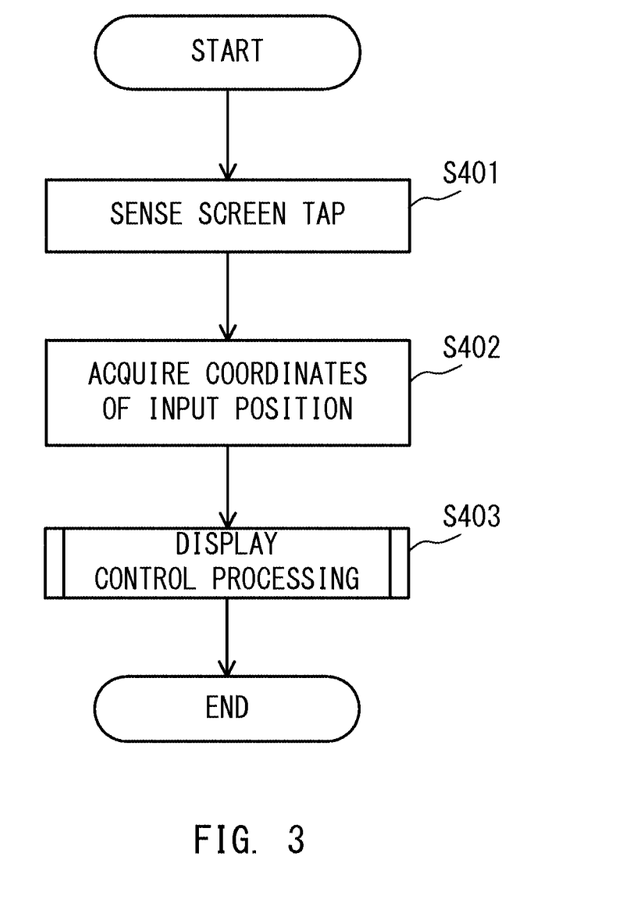
FIG. 3 is a flowchart representing a processing order of an input position acquisition processing.

FIG. 3 is a flowchart representing an acquisition procedure of a plurality of input positions with the input position acquisition unit 201.

The input position acquisition unit 201 senses, through the touch sensor 307, that the display screen of the display 308 was tapped (specified) by the user (S401). The touch sensor 307 senses that there was a slight tap of the display screen with the user's finger. Then, the touch sensor 307 notifies the input position acquisition unit 201 of the tap. This notification enables the input position acquisition unit 201 to sense the tap.

The input position acquisition unit 201 then acquires coordinates of the input position (S402). In a case where a plurality of positions are tapped, the input position acquisition unit 201 acquires the coordinates of the respective input positions. After the acquisition of the coordinates, the input position acquisition unit 201 sends the position signal, representing the position of the coordinates in accordance with the coordinates acquired, to the display control unit 202. This starts the display control processing (S403).

(2) Display Control Processing

Figure 4:
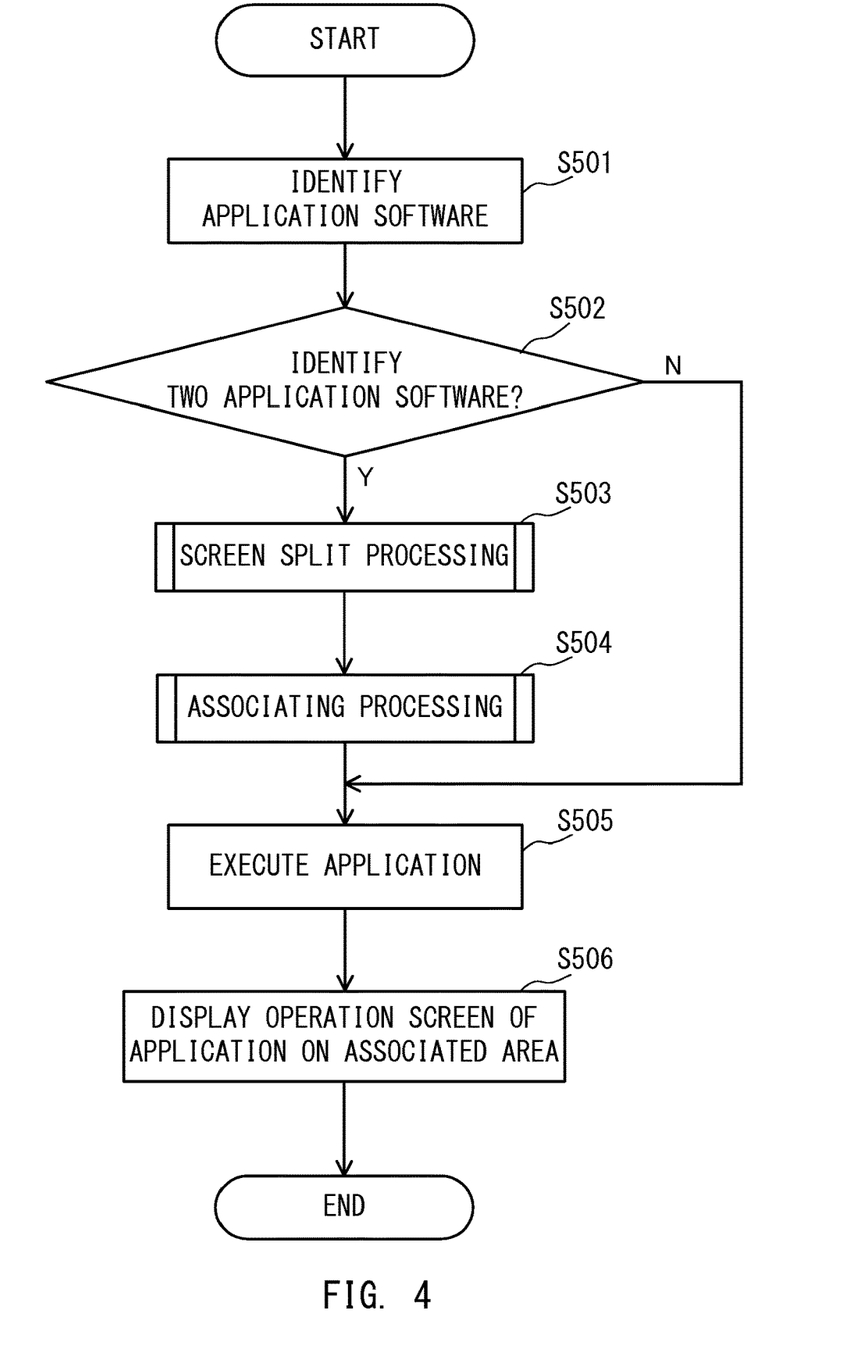
FIG. 4 is a flowchart representing a processing order of a display control processing.

FIG. 4 is a flowchart representing a processing procedure of the display control processing of step S403 in FIG. 3. In the display control processing, the display screen of the display 308 is split into the partial areas. The operational screen of the software application to be executed is displayed in each of the partial areas.

The display control unit 202 identifies, with the identifying unit 203, the software application selected by the user based on the position signal acquired from the input position acquisition unit 201 by the input position acquisition processing. The identifying unit 203 identifies the software application in accordance with the input position represented by the input signal and the display position of the icon associated with the software application displayed on the display 308 (S501).

The display control unit 202 determines whether two software applications were identified by the identifying unit 203 (S502). It means that the display control unit 202 determines whether or not the user are tapping two points on the display screen of the display 308 to select two software applications. In a case where two software applications are identified, the display control unit 202 instructs to execute a screen split processing, which will be described later, to the screen split unit 204 (S502: Y, S503). After the screen split processing, the display control unit 202 instructs to execute an associating processing to the associating unit 205 (S504).

In a case where one software application was identified at step S501 (S502: N) or after the associating processing (S504), the display control unit 202 instructs to execute the identified software application to the executing unit 206. The executing unit 206 executes the software application identified in accordance with the instruction (S505). The display control unit 202 displays the operation screen of the software application to be executed on the partial area associated at step S504. In a case where one software application is executed, the display control unit 202 displays the operation screen over the entire display screen of display 308 (S506).

(3) Display Split Processing

Figure 5:
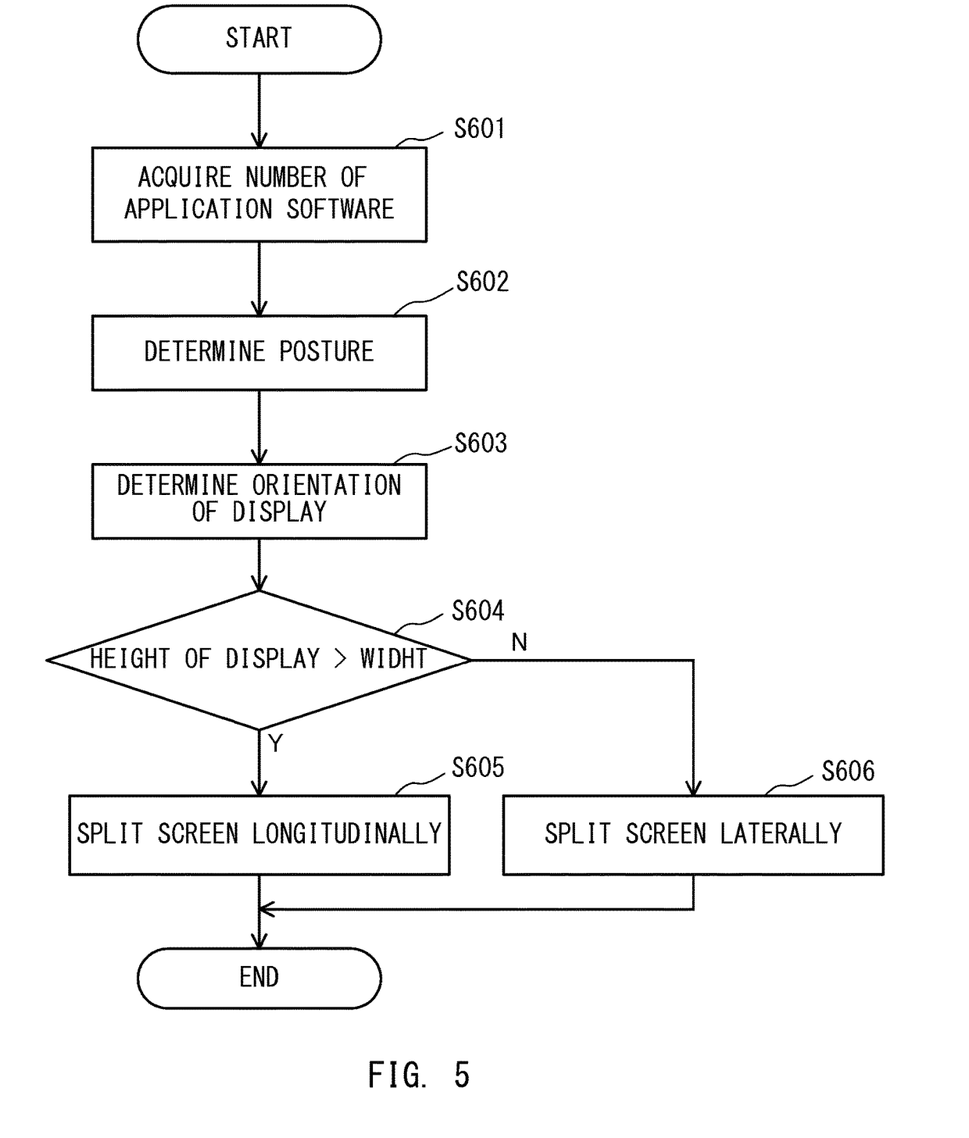
FIG. 5 is a flowchart representing a processing order of screen split processing.

FIG. 5 is a flowchart representing a processing procedure of the screen split processing of step S503 in FIG. 4. In the screen split processing, the display screen of the display 308 is split into a plurality of partial areas. The number of the partial areas to be split is determined in accordance with the number of the software applications identified at step S501 in FIG. 4.

The screen split unit 204 executes the screen split processing in response to the instruction from the display control unit 202. The screen split unit 204 acquires the number of the software applications identified at step S501 in FIG. 4 from the display control unit 202 (S601).

The screen split unit 204 determines the posture of the information processing device based on the sensing result and the like obtained from the acceleration sensor 309 (S602). The screen split unit 204 determines the orientation of the display 308 based on the posture of the information processing device (S603). Determining the orientation of the display 308 enables the screen split unit 204 to determine, with vertical direction being a longitudinal direction, whether the display 308 is longitudinally-placed or laterally-placed.

The screen split unit 204 determines whether or not the height of the display screen of the display 308 is higher than its width based on the orientation of the display 308 previously determined (S604). If the display 308 is longitudinally-placed (i.e., portrait position), the height is longer than its width. If the display 308 is laterally-placed (i.e., landscape position), the height is shorter than its width.

If the height of the screen display is longer than its width (longitudinally-placed), the display screen is horizontally (side to side) split into the partial areas by the screen split unit 204 (S604: Y, S605). If the height of the display screen is shorter than its width (laterally-placed), the display screen is vertically (up to down) split into the partial areas by the screen split unit 204 (S604: N, S606). In this embodiment, two applications are identified so that the display screen is split into two areas.

(4) Associating Processing

Figure 6:
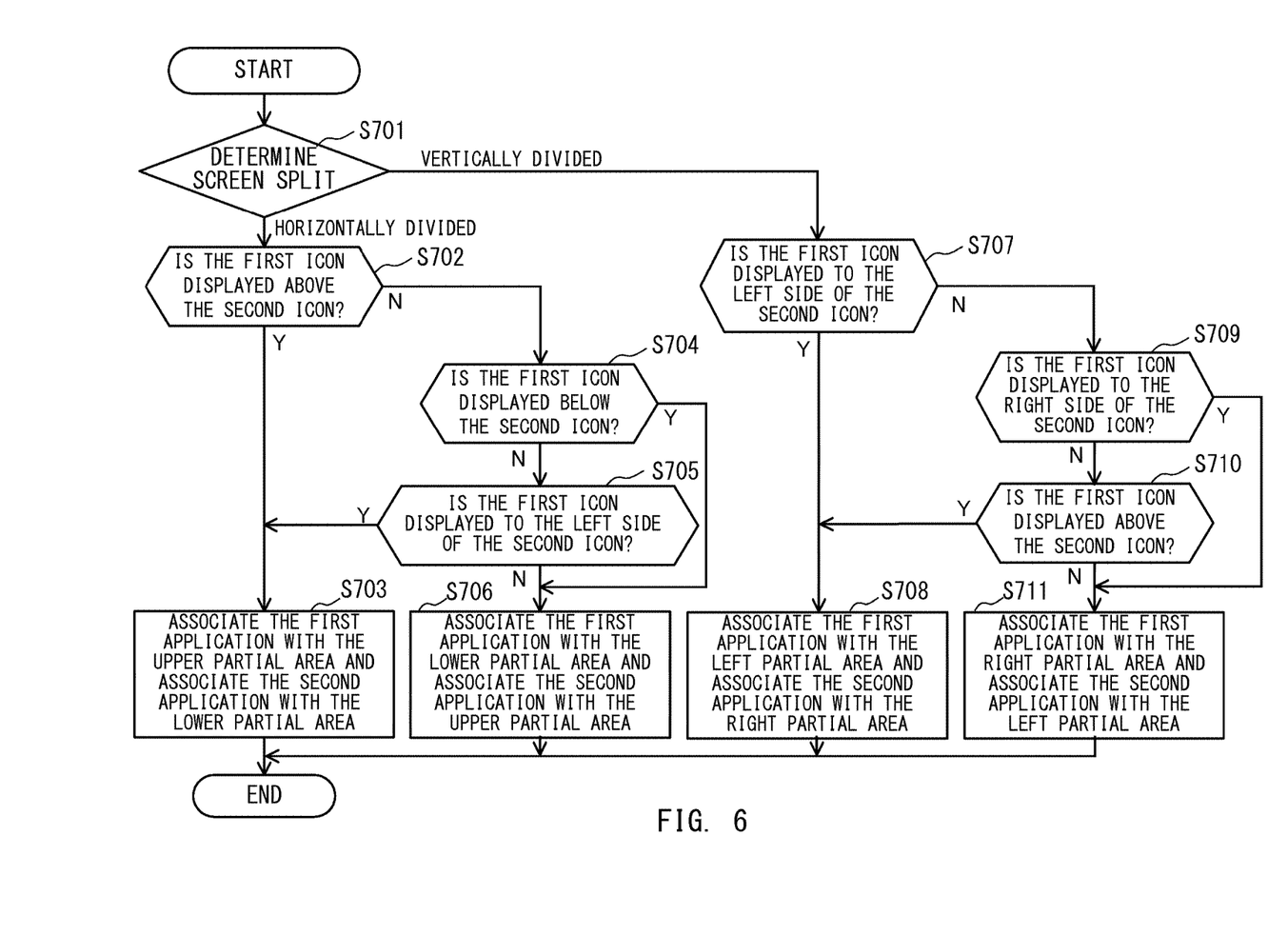
FIG. 6 is a flowchart representing a processing order of an associating processing.

FIG. 6 is a flowchart representing a processing procedure of the associating processing of step S504 in FIG. 4. In the associating processing, each partial area of the display screen of the display 308 split by the screen split processing is associated with the software application software identified. Note that, distinction is made between the two software applications, identified as a "first software application" and a "second software application". Also, icons for activating the first application and the second software application are respectively referred to as a "first icon" and a "second icon".

The associating unit 205 determines how the split of the display screen is going on (S701). The associating unit 205 determines whether the display screen is horizontally split or vertically sprit by the screen split processing.

If it is determined that the display screen is horizontally split, the associating unit 205 determines whether or not the first icon is displayed above the second icon on the display screen (S701: vertical, S702). The associating unit 205 acquires the position signal from the input position acquisition unit 201 via the display control unit 202. Then, the associating unit 205 determines the position relationship between the first icon and the second icon based on the position signal. The associating unit 205 determines the position relationship with the vertical component of the coordinates of the display position of the icon.

If it is determined that the first icon is displayed above the second icon, the associating unit 205 associates the first software application with the upper partial area. Also, the associating unit 205 associates the second software application with the lower partial area (S702: Y, S703).

If it is determined that the first icon is not displayed above the second icon, the associating unit 205 determines whether or not the first icon is displayed below the second icon on the display screen (S702: N, S704). If it is determined that the first icon is displayed below the second icon, the associating unit 205 associates the first software application with the lower partial area. Also, the associating unit 205 associates the second software application with the upper partial area (S704: Y, S706).

If it is determined that the first icon is not displayed below the second icon, it means that the first icon and the second icon are displayed on the same level. In this case, the associating unit 205 determines whether or not the first icon is displayed to the left side of the second icon on the display screen (S704: N, S705). The associating unit 205 determines the position relationship with the horizontal component of the coordinates of the display position of the icon.

If it is determined that the first icon is displayed to the left side of the second icon, the associating unit 205 associates the first software application with the upper partial area. Also, the associating unit 205 associates the second software application with the lower partial area (S705: Y, S703). If it is determined that the first icon is displayed to the right side of the second icon, the associating unit 205 associates the first software application with the lower partial area. Also, the associating unit 205 associates the second software application with the upper partial area (S705: N, S706).

If it is determined at step S701 that the display screen is vertically sprit into the partial areas, the associating unit 205 determines whether or not the first icon is displayed to the left side of the second icon on the display screen (S701: lateral, S707). The associating unit 205 determines the position relationship with the horizontal component of the coordinates of the display position of the icon.

If it is determined that the first icon is displayed to the left side of the second icon, the associating unit 205 associates the first software application with the left partial area. Also, the associating unit 205 associates the second software application with the right partial area (S707: Y, S708).

If it is determined that the first icon is not displayed to the left side of the second icon, the associating unit 205 determines whether or not the first icon is displayed to the right side of the second icon on the display screen (S707: N, S709). If it is determined that the first icon is displayed to the right side of the second icon, the associating unit 205 associates the first software application with the right partial area. Also, the associating unit 205 associates the second software application with the left partial area (S709: Y, S711).

If it is determined that the first icon is not displayed to the right side of the second icon, the associating unit 205 determines whether or not the first icon is displayed above the second icon on the display screen (S709: N, S710). The associating unit 205 determines the position relationship using the vertical component of the coordinates of the display position of the icon.

If it is determined that the first icon is displayed above the second icon, the associating unit 205 associates the first software application with the left partial area. Also, the associating unit 205 associates the second software application with the right partial area (S710: Y, S708). If it is determined that the first icon is displayed below the second icon, the associating unit 205 associates the first software application with the right partial area. Also, the associating unit 205 associates the second software application with the left partial area (S710: N, S711).

Display Mode

Figure 7A:
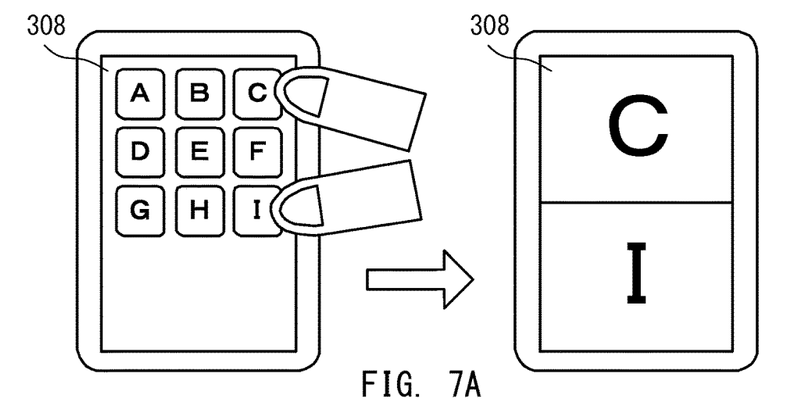
FIGS. 7A to 7C are explanatory diagrams of display modes of display screen.
Figure 7B:
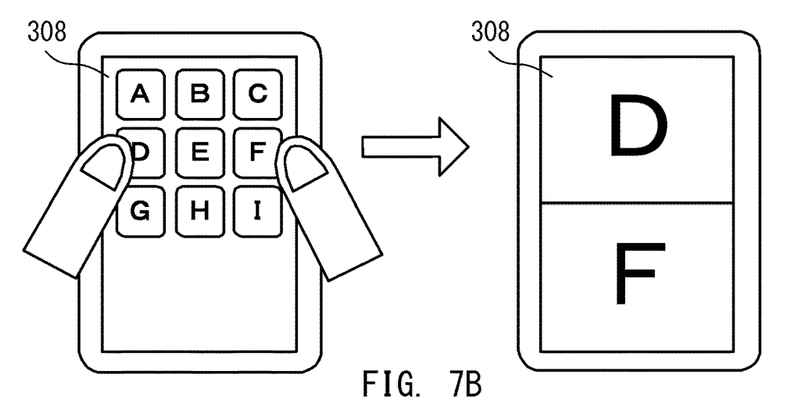
Figure 7C:
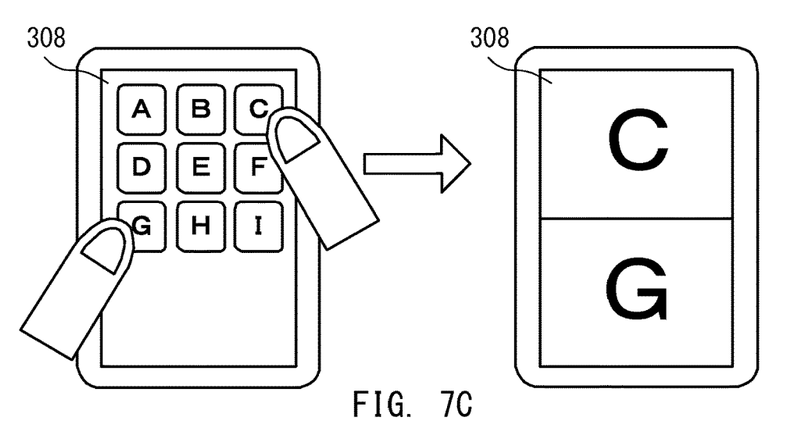

FIGS. 7A to 7C are explanatory diagrams of display modes of the display screen of the display 308 in accordance with the above processing. Arranged icons "A" to "I" are displayed on the display screen of the display 308. Each of the icons "A" to "I" are associated with the software application. When the user taps the icon for a software application he wishes to execute, the CPU 301 identifies the software application to execute. When a plurality of icons are tapped almost at the same time, the CPU 30 executes the software application associated with each of a plurality of icons. The icons are arranged in 3 columns, 3 rows.

FIG. 7A illustrates a display mode in a case where the icon "C" and the icon "I" are tapped. The icon "C" is displayed above the icon "I" so that the operational screen of the software application associated with the icon "C" is displayed above the operational screen of the software application associated with the icon "I". Explaining this case in accordance with the process shown in FIG. 6, the icon "C" corresponds to the first icon and the icon "I" corresponds to the second icon and process of steps S701, S702, and S703 are executed.

FIG. 7B illustrates a display mode in a case where the icon "D" and the icon "F" are tapped. The icon "D" is displayed to the left side of the icon "F" so that the operational screen of the software application associated with the icon "D" is displayed above the operational screen of the software application associated with the icon "F". Explaining the case in accordance with the process shown in FIG. 6, the icon "D" corresponds to the first icon and the icon "F" corresponds to the second icon and process of steps S701, S702, S704, S705 and S703 are executed.

FIG. 7C illustrates a display mode in a case where the icon "C" and the icon "G" are tapped. The icon "C" is displayed above the icon "G" so that the operational screen of the software application associated with the icon "C is displayed above the operational screen of the software application associated with the icon "G". Explaining the case in accordance with the process shown in FIG. 6, the icon "C" corresponds to the first icon and the icon "G" corresponds to the second icon and process of steps S701, S702 and S703 are executed.

As above, in this embodiment, the operation screen of the software application whose icon is displayed at a position closer to the upper left of the display screen is displayed on the upper partial area. Further, in a case where the icons are located within the same distance from the upper left of the display screen, the icon displayed on the upper side is given a priority. Therefore, in FIG. 7C, the operational screen of the software application associated with the icon "C" is displayed on the upper side. It means that the associating unit 205 associates the software application with the partial area in accordance with the display position of the icon. It should be noted that, in this embodiment, upper left of the display screen is used as a reference position, however, other position such as lower right or center of the display screen may also be used as a reference position.

As above, when executing a plurality of software applications, it is possible to display the operational screen of each software application on the associated partial area. This makes possible for the user to simultaneously display a plurality of operational screens on the display 308 without the need of any cumbersome operations. Note that, in the above description, the number of the software applications to be executed is set to be "two", however, over two software applications may be executed. In that case, the partial areas are provided in accordance with the number of software applications to be executed.

In the first embodiment, the display position of the operational screen was determined in accordance with the display position of the icon. The second embodiment enables to determine, by the user, the display position of the operational screen of the application corresponding to each icon. The hardware component and the functional block component of the information processing device of the second embodiment is similar to those of the first embodiment so that description will be omitted. Further, when compared with the first and the second embodiments, main difference lies in the input position acquisition processing. Therefore, the input position acquisition processing will mainly be described here.

Figure 8:
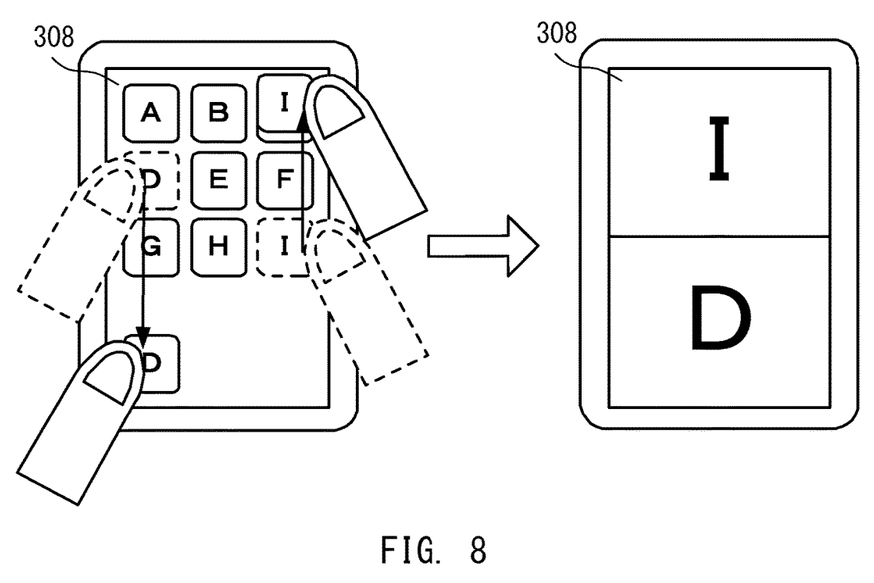
FIG. 8 is an explanatory diagram of display mode of display screen in a second embodiment.

FIG. 8 is an explanatory diagram of the display mode of the display screen of the display 308 in the second embodiment. Similar to FIG. 7, the arranged icons "A" to "I" are displayed on the display screen of the display 308.

In FIG. 8, the user touches (touches for a while) the icon "I" and the icon "D" to drag the icon "I" to the upper side of the display screen and the icon "D" to the lower side of the display screen. The CPU 301 determines where to display the operation screen on the display screen in accordance with the position at which the user released his finger after the drag. It means that the associating unit 205 associates the partial area with the software application in accordance with the position of the icon at a time when the user released his finger. In FIG. 8, the user released his finger after the drag at the position which is higher for the icon "I" than for the icon "D". Therefore, the operational screen of the software application associated with the icon "I" is displayed on the upper partial area. Also, the operational screen of the software application associated with the icon "D" is displayed on the lower partial area.

Figure 9:
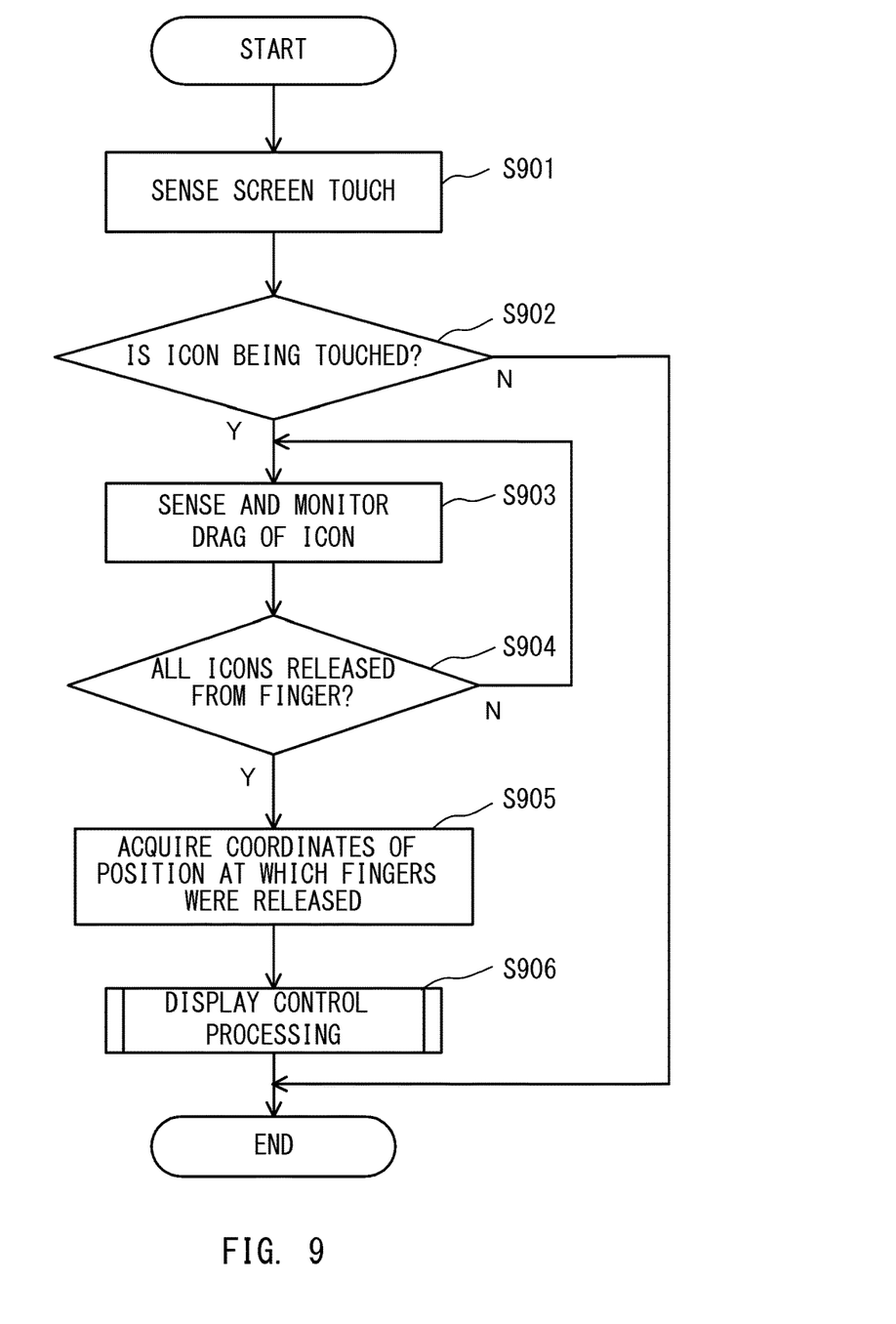
FIG. 9 is a flowchart representing a processing order of the input position acquisition processing of the second embodiment.

FIG. 9 is a flowchart representing a processing procedure of the input position acquisition processing of the second embodiment with the input position acquisition unit 201.

The input position acquisition unit 201 senses that the display screen of the display 308 was touched by the user (S901). The touch sensor 307 senses that the display screen was touched. The touch sensor 307 senses that there was a slight touch to the display screen with the user's finger. Then, the touch sensor 307 notifies the touch and the position at which user touched to the input position acquisition unit 201. This notification enables the input position acquisition unit 201 to sense the touch.

After sensing the touch, the input position acquisition unit 201 determines whether or not the icon was touched in accordance with the position on the display screen at which user touched and the position of the icon displayed on the display screen (S902). If it is determined that the icon was not touched, the processing ends (S902: N). If it is determined that the icon was touched, the input position acquisition unit 201 senses that the icon was dragged and monitors the drag operation (S902: Y, S903). The drag operation means the operation to move the icon while keep touching the icon. In this embodiment, the touch sensor 307 periodically detects the position specified on the touch panel 306. When the user keeps touching the touch panel 306 without releasing his finger from the touch panel 306, the input position at which the user keeps touching his finger is continuously detected, without any interruption, during the periodical detection by the touch sensor 307. The touch sensor 307 identifies the continuously detected input positions as the same input position. Then, the touch sensor 307 notifies information of the input position to the input position acquisition unit 201. In this case, the information corresponding to each of the input positions out of one or more input positions is notified to the input position acquisition unit 201. In this embodiment, when the initially detected input position is moved from the display position of the icon, such behavior is recognized as the drag operation to move the icon. Then, the display control unit 202 moves the display position of the icon. Note that, in this embodiment, even in a case where the user keeps touching the display position of the icon with his finger without moving his finger therefrom, the touch sensor recognizes this behavior as the drag operation with zero (0) movement amount. In step S903, monitoring the drag operation means to track the input position until the user releases his finger from the touch panel 306.

If it is determined that all icons dragged were released from the user's finger, the input position acquisition unit 201 acquires the coordinates of the position on the display screen at which the fingers were released (S904: Y, S905). After the acquisition of the coordinates of the position at which the fingers were released, the CPU 301 executes the display control process (S906). In the display control process, taking the position of the icon for the coordinates of the position at which the fingers were released, the software application is associated with the partial area in the associating processing. The particular processing is similar to that as described with respect to each process in FIG. 6. In this case, the positions at which the first icon and the second icon are displayed in each process in FIG. 6 are replaced with the position at which the user's fingers were released from each icon after dragging each icon. Therefore, the detailed description will be omitted.

As above, in the second embodiment, it is possible to determine, by the user's operation, the partial area at which the operation screen of each software application is displayed when a plurality of software applications are executed. In particular, the partial area at which the operation screen is displayed is determined in accordance with the finger position at which the user dragged the icon and released his finger from the icon, the icon being associated with the software application. This allows the user to determine, by the user's operation, the position to display a plurality of operation screens without the need of any cumbersome operations. Note that, in this embodiment, the icon which is moved by the drag operation is displayed. Therefore, the corresponding relation between the position of the icon moved and the position of the partial area at which the execution screen of the application is displayed are visualized, which is simply understandable. It should be noted that, the process for displaying icon to be moved may be omitted. Instead, the operation screen of the application may display an animation which appears from the display position of the icon and moves toward the partial areas associated with the software application. Further, the operation to the icon is not limited to the drag operation. When it is recognized that the user performed flick (flipping the finger in a specified direction and releasing the finger from the touch panel) at the display position of the icon toward the direction of the partial area where he wishes to display the application screen of the icon, it is possible to associate the application with the partial area in accordance with the flicked direction.

In the smart phone or the tablet PC, a plurality of screen pages in which arranged icons are displayed, may be prepared. In other words, a part of an image with the arranged icons may be displayed on the screen. By flicking the display screen, the user scrolls the image to display a different page. Description will be made in a third embodiment, in a case where selecting a plurality of icons displayed on the different page. The hardware component and the functional block component of the information processing device of the third embodiment is similar to those of the first embodiment so that description will be omitted. Further, when compared with the first and the third embodiments, main difference lies in the input position acquisition processing. Therefore, the input position acquisition processing will mainly be described here.

Figure 10:
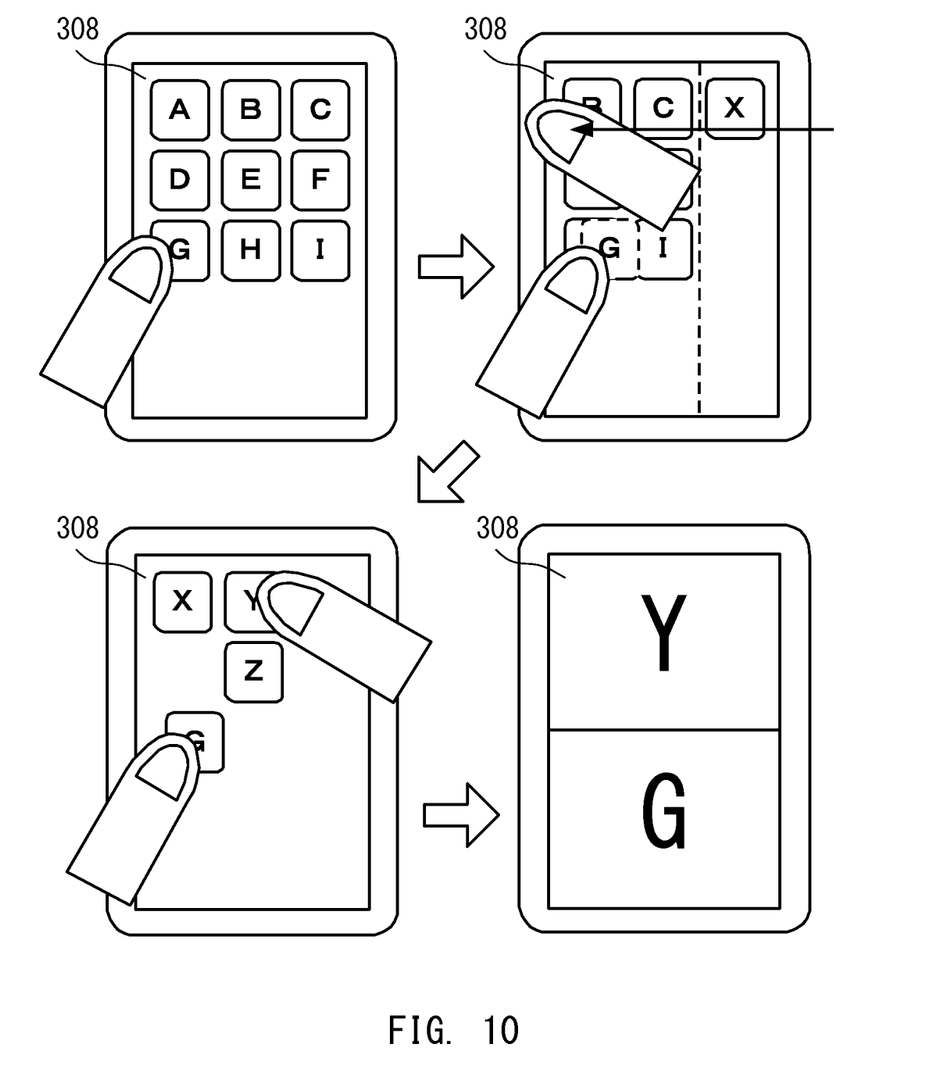
FIG. 10 is an explanatory diagram of display mode of display screen in a third embodiment.

FIG. 10 is an explanatory diagram of the display mode of the display screen of the display 308 in the third embodiment. It is possible to display a page in which the arranged icons "A" to "I" are displayed and a page in which the arranged icons "X" to "Z" are displayed on the display screen of the display 308.

The user touches the icon "G" which is displayed on the display screen with the arranged icons "A" to "I". Further, with his finger keep touching the icon "G", the user flicks the page with other finger to move the screen page. Then, in a page displayed after the page movement, the user touches the icon "Y" with his finger keep touching the icon "G". By releasing the fingers from the respective icons, the software application respectively associated with the icon "G" and the icon "Y" are executed.

In FIG. 10, when the fingers are released from the icons, the icon "Y" is displayed above the icon "G". Therefore, the information processing device displays the operation screen of the software application associated with the icon "Y" on the upper partial area. Also, the information processing device displays the operation screen of the software application associated with the icon "G" on the lower partial area. Note that, similar to the second embodiment, the user may first drag the icon "G" so as to allow the icon "G" to be displayed above the icon "Y" and then, the user may release his fingers. In this case, the display control device displays the operation screen of the software application associated with the icon "G" on the upper partial area. Also, the display control device displays the operation screen of the software application associated with the icon "Y" on the lower partial area.

Figure 11:
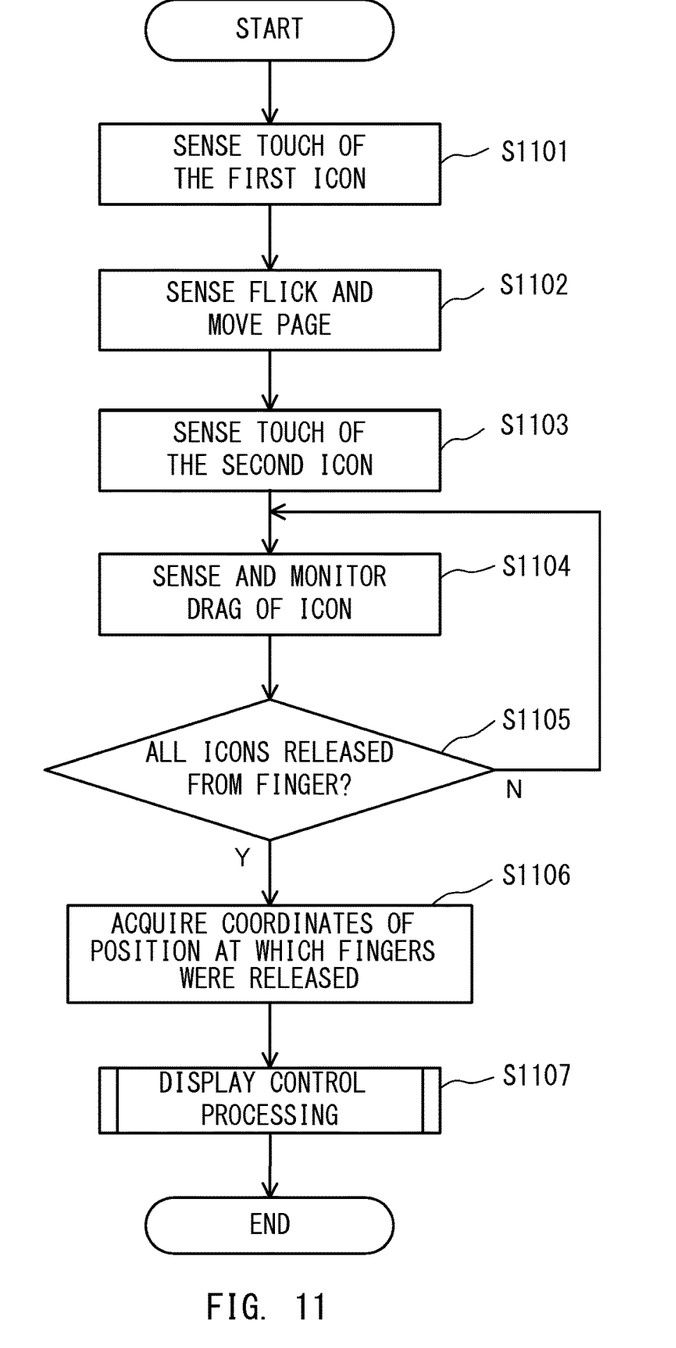
FIG. 11 is a flowchart representing a processing order of the input position acquisition processing of the third embodiment.

FIG. 11 is a flowchart representing the input position acquisition process of the third embodiment with the input position acquisition unit 201.

The input position acquisition unit 201 senses that the first icon (the icon "G" in FIG. 10) displayed on the display screen of the display 308 was touched by the user (S1101). When the input position acquisition unit 201 senses the flick with the first finger keep touched, the CPU 301 moves the page of the display screen in accordance with the flicked direction (S1102). The flick causes page break. The input position acquisition unit 201 senses that the user touched the second icon (the icon "Y" in FIG. 10) after the page movement (S1103). The input position acquisition unit 201 senses that the first icon and the second icon as touched were dragged. Then, the input position acquisition unit 201 monitors the drag operation (S1103, S1104).

When the user ends the dragging of the first icon and the second icon and the icons are released from the user's fingers, the input position acquisition unit 201 acquires the coordinates of the position at which the user's fingers were released (S1105: Y, S1106). After the acquisition of the coordinates of the position at which the user released his fingers, the CPU 301 executes the display control process (S1107). In the display control process, taking the position of the icon for the coordinates of the position at which the fingers were released, the software application is associated with the partial area in the associating process. The particular process is similar to that as described with respect to each process in FIG. 6. In this case, the positions at which the first icon and the second icon are displayed in each process in FIG. 6 are replaced with the position at which the user's fingers were released from each icon after dragging each icon. Therefore, the detailed description is omitted.

As above, in the third embodiment, it is possible to select the icon displayed on the different page when executing a plurality of software applications.

In the first embodiment to the third embodiment, descriptions were made with regard to the example of generating the partial areas by splitting the display area and the like of the display 308. In the forth embodiment, the user is allowed to control the size of the partial area. The hardware component and the functional block component of the information processing device of the forth embodiment is similar to those of the first embodiment so that description will be omitted. Further, when compared with the first and the forth embodiments, there is a difference in the screen split processing. For other processing, similar processing will be executed.

Figure 12A:
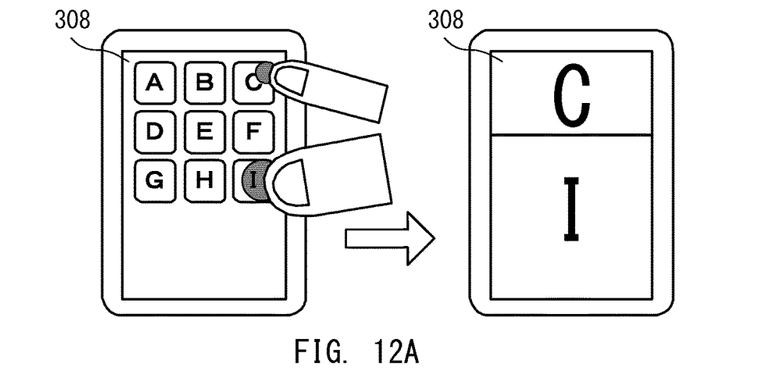
FIGS. 12A to 12C are explanatory diagrams of display mode of display screen of a forth embodiment.
Figure 12B:
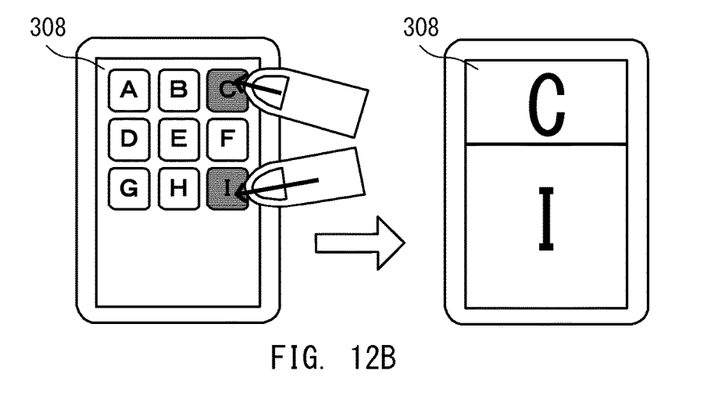
Figure 12C:
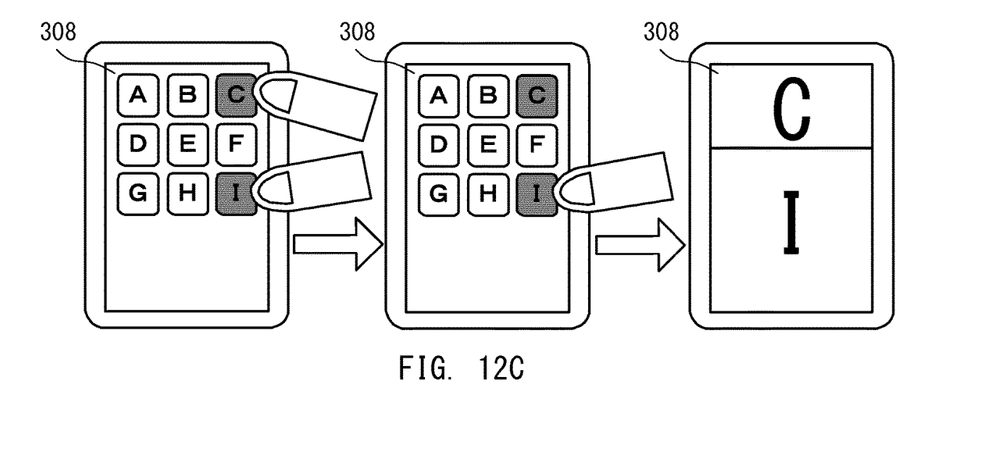

The size of the partial area is determined by, for example, contact area of the finger, pressure of the finger, and length of the touch time (pressure time) when the user touches the icon. FIGS. 12A to 12C are the explanatory diagrams of display mode of the display screen of the display 308. The arranged icons "A" to "I" are displayed on the display screen of the display 308. The information concerning the contact area, pressure, length of the pressure time at the time of touching the icon is included in, for example, the position signal. The CPU 301 acquires the position signal including such information at step S402 in FIG. 3. In the screen split processing, the size of the partial area is adjusted after steps S605 and S606 of FIG. 5, for example, in accordance with the contact area, pressure and the length of the pressure time at the time of touching the icon.

FIG. 12A is an explanatory diagram in a case where the partial area is determined in accordance with the contact area of the finger. In FIG. 12A, the icon "C" and the icon "I" are tapped. The finger for tapping the icon "C" is smaller than that of the icon "I" in terms of the contact area. In accordance with the area ratio, the CPU 301 determines the ratio of the partial areas. As a result, the operation screen of the software application associated with the icon "C" is displayed with smaller size than that associated with the icon "I".

FIG. 12B is an explanatory diagram in a case where the partial area is determined in accordance with the pressure of the finger. In FIG. 12B, the icon "C" and the icon "I" are pressed. The pressure for the icon "I" is greater than the pressure for the icon "C". The CPU 301 determines the ratio of the partial areas in accordance with the pressure ratio. As a result, the operation screen of the software application associated with the icon "C" is displayed with the smaller size than that associated with the icon "I" and displayed.

FIG. 12C is an explanatory diagram in a case where the partial area is determined in accordance with the pressure time by the finger. In FIG. 12C, the icon "I" is touched longer than the icon "C". The CPU 301 determines the ratio of the partial area in accordance with the ratio of the pressure time. As a result, the operation screen of the software application associated with the icon "C" is displayed with the smaller size than that associated with the icon "I" and displayed.

As above, in the forth embodiment, it becomes possible for the user to control the size of the partial area depending on how the icon is touched.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-091089, filed Apr. 24, 2013, which is hereby incorporated by reference herein in its entirety.

What is claimed is:

1. An information processing apparatus comprising:
a processor and at least one memory, the processor operating to:
display a plurality of icons on a display screen;
control the display screen to move between a plurality of pages; and
acquire an input position from a user's finger touching a selected one of the plurality of the icons displayed on the display screen,
wherein the processor acquires an input position for a first icon selected among a first plurality of icons displayed in a first page of the display screen when a first finger contacts the first icon from the first plurality of icons,
wherein, with the first finger maintaining contact on the selected first icon from the first page during a flick of the first page by a second finger from the first page to a second page, the processor acquires an input position for a second icon selected among a second plurality of icons displayed in the second page of the display screen while maintaining the input position acquired for the selected first icon,
wherein the processor further acquires a number of applications identified by the selected first and second icons and divides the display screen into a plurality of partial areas in accordance with the number of applications and the input positions for the first and second icons,
wherein, when contact by the first and second fingers is released from the selected first and second icons, the processor acquires coordinate positions for the first and second icons, where the coordinate positions comprise the input position at which the contact of the first icon by the first finger is released and the input position at which the contact of the second icon by the second finger is released, and
wherein the processor displays together simultaneously on the divided display screen a first operation screen of an application related to the selected first icon and a second operation screen of another application related to the selected second icon at the respective partial areas, which are associated with the respective coordinate positions acquired after the contact by the first and second fingers are released from the respective first and second icons.

2. The information processing apparatus according to claim 1, wherein the processor displays, following displaying of the first page, the second page in accordance with a flick direction of the display.

3. An information processing apparatus comprising:
a processor and at least one memory, the processor operating to:
display a plurality of icons on a display screen;
acquire an input position for a first icon selected among the plurality of icons displayed on the display screen in a case where a first finger of a user contacts the first icon from the plurality of icons, and acquire an input position for a second icon selected among the plurality of icons in a case where a second finger of the user contacts the second icon;
acquire a number of applications identified by the selected first and second icons and divide the display screen into a plurality of partial areas in accordance with the number of applications and the input positions for the first and second icons;
detect a pressure of the first finger of the user and the second finger of the user when the first finger and the second finger contact the first icon and the second icon, respectively; and
display together simultaneously on the divided display screen a first operation screen of an application related to the selected first icon and a second operation screen of another application related to the selected second icon at the respective partial areas,
wherein a size of each respective partial area is determined in accordance with the pressure of the first finger and the second finger when the first finger and the second finger contact the selected first icon and the second icon, respectively.

4. The information processing apparatus according to claim 3, wherein, the larger the pressure, the larger the size of the partial area is.

5. A method for controlling an information processing apparatus comprising:
acquiring an input position for a first icon selected among a first plurality of icons displayed in a first page of a display screen when a first finger contacts the first icon from the first plurality of icons;
with the first finger maintaining contact on the selected first icon from the first page during a flick of the first page by a second finger from the first page to a second page, acquiring an input position for a second icon selected among a second plurality of icons displayed in a second page of the display screen while maintaining the input position acquired for the selected first icon;
acquiring a number of applications identified by the selected first and second icons and dividing the display screen into a plurality of partial areas in accordance with the number of applications and the input positions for the first and second icons;
when contact by the first and second fingers is released from the selected first and second icons, acquiring coordinate positions for the first and second icons, where the coordinate positions comprise the input position at which the contact of the first icon by the first finger is released and the input position at which the contact of the second icon by the second finger is released; and
displaying together simultaneously on the divided display screen a first operation screen of an application related to the selected first icon and a second operation screen of another application related to the selected second icon at the respective partial areas, which are associated with the respective coordinate positions acquired after the contact by the first and second fingers are released from the respective first and second icons.

6. The method for controlling an information processing apparatus according to claim 5, wherein following displaying of the first page, the second page is displayed in accordance with a flick direction of the display.

\* \* \* \* \*